Aug. 2, 1966  H. E. HALL, JR  3,264,477
EPITHERMAL NEUTRON WELL LOGGING
Filed March 30, 1962  2 Sheets-Sheet 1

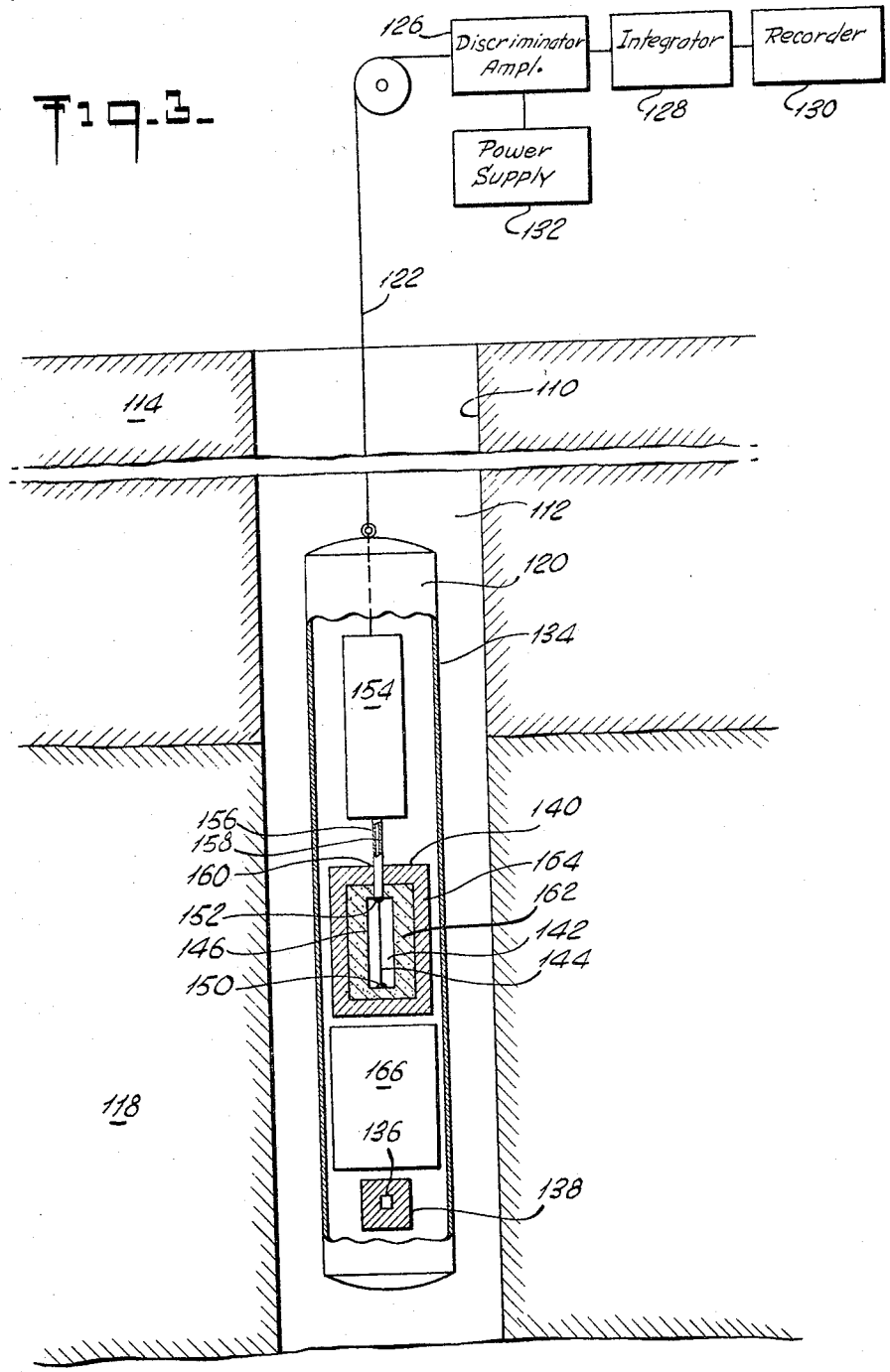

United States Patent Office

3,264,477
Patented August 2, 1966

3,264,477
EPITHERMAL NEUTRON WELL LOGGING
Hugh E. Hall, Jr., Houston, Tex., assignor to Texaco Inc.,
New York, N.Y., a corporation of Delaware
Filed Mar. 30, 1962, Ser. No. 183,864
14 Claims. (Cl. 250—83.1)

The present invention relates to new and useful improvements in radiation detection apparatus and, more particularly, to apparatus for the detection of neutrons of epithermal energies to the substantial exclusion of other nuclear particles and radiations.

In the investigation of earth formations surrounding a well bore, it is customary to obtain information concerning the nature of the formations by determining their effect on fast neutrons emanating from a neutron source lowered into the well bore. In one of the several modifications of the neutron logging method it is desired to measure the epithermal neutron flux by means of a suitable detector spaced a predetermined distance away from a source of fast neutrons as an indication of the hydrogen content, or porosity, of such formations. One advantage of the epithermal log, as such a system is called, over other neutron logging systems based on the measurement of thermal neutrons or gamma radiation resulting from neutron capture, is that the epithermal neutron flux is less affected by elements other than hydrogen which may be present in the earth formations, particularly the element chlorine. One disadvantage of the epithermal neutron logging method, however, has been the relatively low sensitivity, or low counting rate, of epithermal neutron detectors.

One type of epithermal neutron detector available up to now is the boron trifluoride-filled proportional counter with a cadmium shield surrounding its outer dimensions. Such a counter is described by Korf, "Electron and Nuclear Counters," published by D. Van Nostrand Company (1946). On page 54 Korf points out that a cadmium shield of ½ to 1 mm. thickness will be practically opaque to thermal neutrons and practically transparent to neutrons of more than one electron volt (hereinafter abbreviated e.v.) energy. However, with a detector of this type the counting rate for a given neutron population is relatively low. One reason for this is the lower capture cross-section of the boron in the counter for epithermal neutrons as compared to the capture cross-section of boron for thermal neutrons.

Another type of epithermal neutron detector is described in U.S. Patent 2,769,915 which issued to Charles W. Tittle on November 6, 1956. In this case the detecting element is a scintillation phosphor sensitive to gamma radiation produced as a result of epithermal neutron capture in a metal foil surrounding the phosphor. This foil comprises an element which reacts with neutrons of epithermal energies through resonance capture and is thus predominately selective to epithermal neutrons of a narrow energy range. The phosphor and foil are in turn surrounded by a gamma radiation shield and this in turn is surrounded by a thermal neutron shield which permits the passage of epithermal neutrons but is opaque to thermal neutrons. Substances mentioned by Tittle for this purpose are cadmium, gadolinium and dysprosium.

The present method of detecting epithermal neutrons differs from those described above in at least one important aspect, namely, that the epithermal neutrons are not detected directly. Rather, after removal of thermal neutrons by a suitable impervious shield which selectively passes epithermal neutrons, these epithermal neutrons are then passed into an hydrogenous material where they are slowed to thermal energies and these resultant thermal neutrons are then detected as a measure of the epithermal neutron flux in the vicinity of the detector with much higher efficiency than is possible for the direct detection of epithermal neutrons.

It is an object of this invention to provide a detection system for epithermal neutrons to the substantial exclusion of other nuclear particles and radiation.

It is a further object of this invention to provide a detection system especially suited for making an epithermal neutron log of earth formations surrounding a well bore.

In accordance with this invention a detection system for epithermal neutrons has been devised whereby it is possible to selectively measure epithermal neutrons in the presence of thermal neutrons. To accomplish this a thermal neutron absorbing material is provided which will preferentially absorb thermal neutrons but is relatively transparent to neutrons in the epithermal range. Epithermal neutrons passing through this absorber then enter into a neutron moderator which is preferably a hydrogen-containing substance wherein the epithermal neutrons are slowed down to thermal energies by collision with hydrogen atoms. The resulting thermalized neutrons are then detected by a suitable thermal neutron detector of the proportional counter or scintillation types, the response of which is rendered preferential to thermal neutrons through appropriate means, for example, associated electrical circuits which distinguish between the responses due to the thermal neutrons and other nuclear radiation, such as gamma radiation, which may find their way into the active portion of the counter or scintillator and be detected therein.

Further in accordance with this invention, an epithermal neutron detection system especially suitable for making epithermal neutron logs of earth formations traversed by a well bore has been devised which enables the selective detection of neutrons of epithermal energies ranging from approximately one to several electron volts in the presence of other nuclear particles and radiations. In brief, one embodiment of this well logging detection system employs a gas filled counter of the proportional type which is rendered sensitive to slow neutrons, preferably by employment of a filling gas containing boron trifluoride. Surrounding this proportional counter is a volume of solid or liquid hydrogenous material, such as paraffin wax, a plastic, a liquid hydrocarbon, ordinary water, or "heavy water" in sufficient thickness to slow down any epithermal neutrons entering therein to thermal energies through collision with the hydrogen nuclei thereof. Surrounding the hydrogenous material is a thin layer of a material which preferentially absorbs neutrons of thermal energies (in the range of 0.025 e.v.) while being substantially transparent to epithermal neutrons (neutrons having energies slightly higher than thermal energies). Suitable electrical means is provided for operation of the proportional counter to enable the detection of pulses resulting from interaction of thermal neutrons with boron atoms within the counter to the substantial exclusion of pulses due to other nuclear particles or radiation.

For an understanding of the invention, attention is directed to the following detailed description and accompanying drawings. The features of the invention which are believed to be novel are particularly pointed out in the appended claims.

In the drawings:

FIG. 3 is a diagrammatic showing of the system for conducting an epithermal neutron well logging operation.

Figure 1:
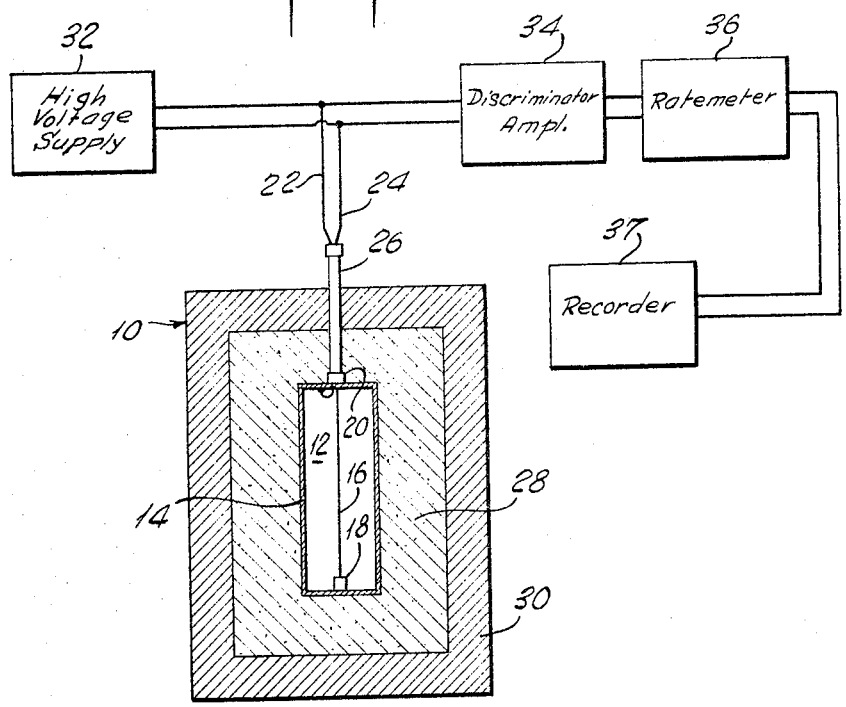
FIG. 1 is a schematic representation of an epithermal neutron detection system in accordance with the principles of the invention wherein a proportional counter is employed as the detecting element.

Referring now to FIG. 1 of the drawing, numeral 10 represents an epithermal neutron detecting assembly. Numeral 12 represents a proportional counter located at the center of the assembly and having an anode wire 16 and a cathode envelope 14 enclosing the detector. Preferably, proportional counter 12 is rendered sensitive to the detection of thermal neutrons by filling with a gas containing boron trifluoride. Anode wire 16 is held under tension in fixed position within the detector by connection to bottom insulator 18 and top feed-through insulator 20. Cathode 14 and anode wire 16 are electrically connected to cathode lead 22 and anode lead 24, respectively. Leads 22 and 24 are brought out through conduit 26 and are connected to necessary electrical equipment as described below.

Completely enclosing proportional counter 12 is a hydrogenous substance 28 which may be a solid, as shown, or it may be a hydrogenous liquid held in a suitable container if so desired. Paraffin wax is a highly suitable material for this purpose but almost any hydrogen-containing material may be used provided it does not comprise neutron reactive elements with appreciable capture cross sections for thermal neutrons in sufficient concentration to interfere with the accuracy of the measurements. Surrounding hydrogenous material 28 is a layer of thermal neutron absorbing material 30 which preferentially absorbs thermal neutrons without appreciable reaction with epithermal neutrons. Cadmium metal is a preferred material for this purpose since it has a capture cross section of about 3000 barns for neutrons of 0.25 e.v. (electron volt) energy (thermal neutrons) and has a capture cross section of only 22 barns for epithermal neutrons of 1 e.v. energy. In addition, cadmium exhibits no resonance captures for neutron energies below about 18.5 e.v. This property permits passage of neutrons having energies in the range of from below 1 e.v. up to about 18.5 e.v. Gadolinium also has a high ratio of thermal neutron capture cross section to epithermal cross section but the epithermal cross section is still in the neighborhood of 5000 barns and a high percentage of the epithermal neutrons would be captured, thus lowering the efficiency of the detection assembly for epithermal neutrons. There are numerous other elements which have higher capture cross sections for thermal neutrons than for epithermal neutrons but none are as effective for this purpose as cadmium due to the fact that they either have appreciably higher capture cross sections for one (1) e.v. neutrons or have resonance captures in the epithermal neutron range.

High voltage supply 32 furnishes operating potential including the necessary anode-to-cathode voltage for operation of proportional counter 12. Output pulses from proportional counter 12 are fed via anode lead 22 to discriminator amplifier 34. Here the pulses are separated on the basis of pulse height and those pulses of at least a predetermined amplitude and which are due to the interaction of thermal neutrons with the boron atoms contained in the filling gas of proportional counter 12 are amplified and coupled to a ratemeter 36. The ratemeter 36 functions in known manner to provide an output signal which is a function of the intensity, i.e., rate-of-occurrence of the pulses applied thereto from the amplifier discriminator 34. The output signal of the ratemeter 36 is coupled to a recorder 37 where a quantitative indication in the form of a record is obtained of the epithermal neutron flux being measured by the assembly. Pulses having amplitudes below the predetermined level set in discriminator amplifier 34 are rejected. These smaller pulses primarily originate as a result of the detection of gamma radiation in proportional counter 12.

Figure 2:
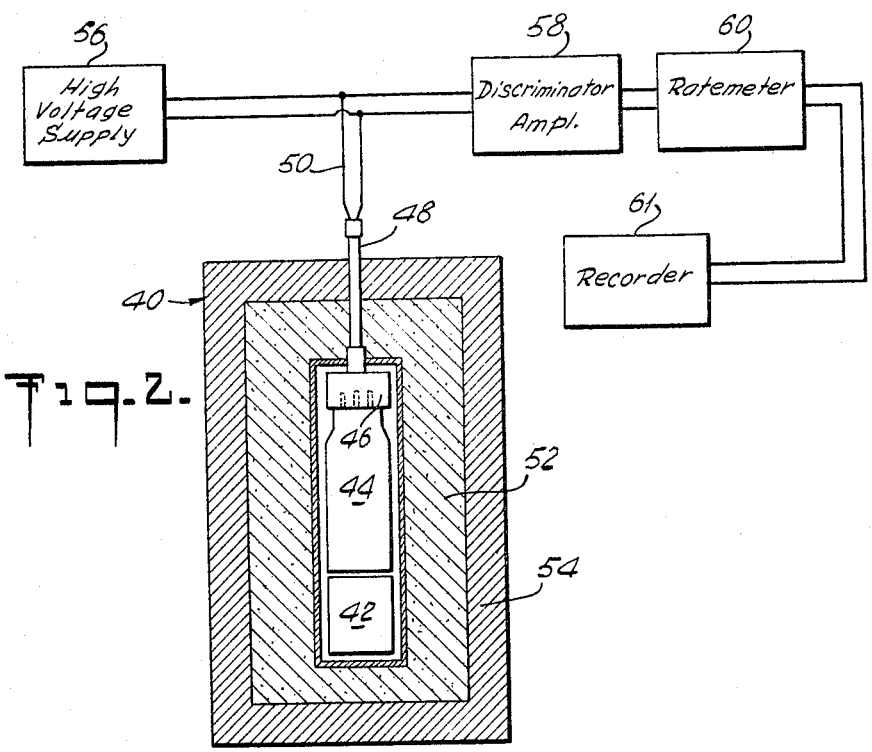
FIG. 2 is also a schematic representation similar to FIG. 1 illustrating another embodiment of the invention wherein the detecting element is a scintillation type detector.

Referring now to FIG. 2, which shows an embodiment of the invention employing a scintillation type detecting element, numeral 40 refers generally to an epithermal neutron detecting assembly, at the center of which is a thermal neutron responsive luminophor 42 which preferably may be an europium activated lithium iodide crystal but may be any of the well known thermal neutron sensitive luminophors. For example, other inorganic luminophors such as lithium fluoride, lithium bromide, and the like may be used. Also, a boron or lithium loaded plastic luminophor or a thermal neutron sensitive liquid luminophor may be used, such as a solution of borazol in xylene, etc. Adjacent one end of luminophor 42 is a photomultiplier tube 44 which is mounted in a tube socket 46. Conduit 48 is provided at the end of tube socket 46 to permit bringing in electrical leads 50 for the operation of photomultiplier 44. A hydrogenous material 52 surrounds luminophor 42, photomultiplier tube 44 and socket 46 and may consist of any suitable hydrogen-containing substances described with reference to FIG. 1. A thermal neutron absorbing material 54 surrounds the assembly and is preferably comprised of cadmium or any element having a high thermal neutron capture cross section to epithermal neutron capture cross section ratio and having no significant resonance captures in the epithermal neutron range below about 18.5 e.v.

The necessary operating voltages for photomultiplier tube 44 are furnished by voltage supply 56 by way of connecting leads 50. Output pulses from photomultiplier tube 44 are fed by means of connecting leads 60 to discriminator amplifier 58 wherein those pulses above a predetermined amplitude are separated and thence fed to ratemeter 60. The ratemeter 60 functions in known manner to provide an output signal which varies as a function of the intensity of the pulses applied thereto from the discriminator amplifier 58. The output of the ratemeter 60, which is preferably in the form of a varying unidirectional potential, is coupled to a recorder 61 where an indication in the form of a record is obtained of the epithermal neutron flux being measured. The smaller pulses fed to discriminator amplifier 58 due to detection of relatively low energy gamma radiation are selectively rejected at this point.

Referring now to FIG. 3, there is shown a bore hole 110 containing the usual bore hole fluid 112 and which traverses a series of earth formations 114, 116 and 118 about which logging information may be desired. Within bore hole 110 there is shown a logging instrument or sonde 120 suspended therein by a means of a cable 122 running over a measuring wheel 124 for determining the length of cable 122 lowered into the bore hole 110 at any given time. Cable 122 also provides a means for electrically coupling sonde 120 to electronic and recording apparatus at the surface which comprises discriminator amplifier 126, integrator 128, recorder 130 and the power supply 132.

Sonde 120 is provided with a housing 134 formed in accordance with known techniques to withstand the pressures encountered within an earth bore. Within housing 134 and preferably disposed near the lower end thereof is a suitable neutron source 136 contained within source holder 138. Source 136 may be any of the so-called natural sources such as radium-beryllium and the like, but neutron emitting sources which emit relatively few gamma quanta, such as plutonium-beryllium and radium D-beryllium, are preferred. Positioned above source 136 at a fixed predetermined distance is a detection assembly 140 of the type shown in FIGURE 1.

Numeral 142 represents a proportional counter located at the center of the assembly and having an anode wire 144 and a cathode envelope 146 enclosing the detector. Proportional counter 142 is rendered sensitive to the detection of thermal neutrons, preferably by filling with a gas containing boron trifluoride. Anode wire 144 is held under tension in fixed position within the detector by connection to bottom insulator 150 and top feed-thru insulator 152. Anode 144 and cathode 146 are electrically connected to preamplifier 154 by means of anode lead 156 and cathode lead 158 respectively. Leads 156 and 158 are brought out of detector assembly 140 through conduit 160.

Completely enclosing proportional counter 142 is a moderator 162, such as paraffin wax, which serves to slow down to thermal energies any epithermal neutrons entering therein. Surrounding moderator 162 is a layer of thermal neutron absorbing material 164, such as cadmium, which preferentially absorbs thermal neutrons and is relatively transparent to neutrons of epithermal energies.

The output of preamplifier 154 is electrically connected to cable 122 which is in turn electrically connected to the surface equipment previously described. Numeral 166 represents a radiation shield positioned between source holder 138 and detector assembly 140. For eliminating the passage of fast neutrons directly from neutron source 136 to detector assembly, radiation shield 166 may comprise a neutron moderating substance such as a plastic, water paraffin, or other hydrogen-containing material. If a source, such as radium-beryllium is employed which emits an appreciable quantity of gamma radiation, radiation shield 166 preferably should comprise one or more of the non-radioactive heavy elements, such as lead, tungsten, etc. or any one of the commercial alloys containing these or other high atomic number metals.

The present invention is useful for the measurement of the epithermal neutron population or flux in the vicinity of the detecting assembly to the substantial exclusion of other nuclear particles and radiation which also may be present in the vicinity. It is particularly useful in connection with well logging where it is desired to measure the effect of earth formations traversed by a well bore on fast neutrons emanating from a source of fast neutrons passed through the well bore at a fixed distance from the detecting assembly. Under these conditions the fast neutrons are slowed down by the hydrogen atoms in the borehole fluid and to some extent in the formation. This slowing down process is due to collision of the fast neutrons with hydrogen nuclei with a portion of the neutron's energy being transferred to the hydrogen nuclei with each collision. Approximately 12 such collisions are necessary to slow fast neutrons from a natural source such as radium-beryllium or plutonium beryllium, etc. to thermal energies. The conventional neutron-gamma log and neutron-thermal neutron log are based on measuring the gamma rays emitted by capture of the thermal neutrons in the formations or by measuring the thermal neutron population, respectively. Both of these logs are subject to influence, with the introduction of error, by the presence of certain elements other than hydrogen which are often present in an earth formation, principally chlorine, calcium, silicon and boron. However, in the case of an epithermal neutron log these other elements play very little effect on the epithermal neutron population and an epithermal log generally gives a more accurate indication of the hydrogen content of the formations surrounding a well bore. In order to obtain such a log, however, it is necessary to measure the epithermal neutron flux in the presence of thermal neutrons and gamma rays. For accurate results the detecting system should be sensitive only to epithermal neutrons and should not be appreciably affected by other nuclear particles and radiations which may be present simultaneously. The detecting system of this invention is ideally suited for making such measurements.

In the detection system described in connection with FIG. 1, epithermal neutrons pass readily through the thermal neutron absorbing material 30 which preferably is cadmium metal of about ½ to 1 millimeter thickness. Shields of other elements having a high ratio of thermal neutron capture cross section to epithermal neutron capture cross section may be employed if desired. Gadolinium and dysprosium are examples of other materials which might be employed. However, since both of these materials have resonance captures in the neighborhood of 2 e.v. they are not as effective nor as suitable as cadmium for the purpose of the present invention. Thermal neutrons are substantially completely absorbed by cadmium shield 30 but epithermal neutrons and gamma rays will readily pass through this element.

Epithermal neutrons passing through shield 30 enter hydrogenous material 28 where they are slowed to thermal energies by collision with hydrogen atoms. Solid pariffin wax is a suitable material for this purpose but any hydrogen-containing substance will serve the desired purpose provided it does not contain appreciable quantities of thermal neutron capturing elements. Plastics also may be used, as well as liquids, such as oil or water by providing a suitable container in the case of liquids. The thermal neutrons produced in hydrogenous material 28 have a finite lifetime before they are captured. During this time they diffuse through the surroundings and many will enter proportional counter 12 where they are captured by boron atoms contained in this counter. The resulting alpha particle causes an electrical discharge to take place with the result that an electrical pulse is observed at the anode of the counter in accordance with conventional counter operation. Some of the thermal neutrons in the hydrogenous material will of course be captured by the hydrogen atoms in the material itself with the production of 2.2 m.e.v. gamma rays. These gamma rays, as well as gamma rays entering from the outside, will be detected by the proportional counter but the pulses produced from these gamma rays in the counter will be of lesser amplitude than the pulses produced by the detection of thermal neutrons. They may, therefore, be separated readily in discriminator amplifier 34.

The advantage of the present epithermal neutron detection system lies in the fact that the proportional counter is more sensitive to thermal neutrons than to epithermal neutrons and thus the counting rate is increased as a result of the epithermal neutrons being thermalized in the hydrogenous material. For practical purposes an increase in counting rate of as much as 100% may be observed, as compared with a similar system depending upon the detection of the epithermal neutrons directly without the thermalizing step.

The operation of the embodiment shown in FIG. 2 is based on the use of a thermal neutron sensitive luminophor in a scintillation type detection system. When thermal neutrons are detected in a thermal neutron sensitive luminophor, such as lithium iodide, photons produced by the resulting secondary alpha and triton particles from the interaction of thermal neutrons with lithium nuclei have energies corresponding to photons produced in the same luminophor by detection of 3.6 m.e.v. gamma radiation. Detected thermal neutrons can, therefore, be distinguished from detected gamma radiation having energies below about 3.6 m.e.v. by suitably establishing the bias of discriminator amplifier 58 to amplify only those pulses resulting from the detection of thermal neutrons and other radiations producing pulses which are equal to or larger than the pulses originating from the detection of thermal neutrons. Thus, in such a detection system the thermal neutron response of the luminophor element may be readily distinguished and separated from the response due to detection of the 2.2 m.e.v. gamma radiations produced in the vicinity of the detection system by interaction of thermal neutrons with hydrogen nuclei, as well as the response due to detection of so-called natural gamma radiations in the surrounding formations, which normally have energies in the range of 1.2 m.e.v. and lower. In the presence of high energy gamma radiation, for example, thermal neutron capture gamma radiation from various nuclei, which may have energies up to approximately 10 m.e.v., a single channel pulse height analyzer, which would be biased such that only pulses falling within the range of approximately 3.2 to 4.0 m.e.v. would be passed to ratemeter 60 may be substituted for discriminator 50. Such an arrangement would minimize the sensitivity of the detection system to high energy gamma radiation.

While certain specific embodiments have been shown and described, it will be understood that various modifications may be made without departing from the principles of the invention. The appended claims are, therefore, intended to cover any such modifications within the true spirit and scope of the invention.

I claim:

1. Apparatus for detecting epithermal neutrons comprising:
   (a) a radiation detector sensitive to thermal neutrons,
   (b) neutron thermalizing material surrounding said radiation detector wherein neutrons having energies in the epithermal range are slowed down to thermal energies, and
   (c) thermal neutron absorbing material comprising cadmium surrounding said neutron thermalizing material, said neutron absorbing material comprising cadmium being exposed to external neutron radiation, including epithermal neutrons to be detected.

2. Apparatus in accordance with claim 1 wherein said radiation detector sensitive to thermal neutrons is a boron-sensitive proportional counter.

3. Apparatus in accordance wtih claim 2 wherein said proportional counter contains boron trifluoride as a filling gas.

4. Apparatus in accordance with claim 1 wherein said radiation detector sensitive to thermal neutrons is a scintillation detector.

5. Apparatus in accordance with claim 4 wherein the luminophor element of said scintillation detector is lithium iodide.

6. Apparatus in accordance with claim 1 wherein said thermalizing material is a hydrogen-containing substance.

7. Apparatus in accordance with claim 6 wherein said hydrogen-containing substance is a hydrocarbon.

8. Apparatus in accordance with claim 7 wherein said hydrocarbon is a high molecular weight solid.

9. Apparatus in accordance with claim 6 wherein said hydrogen-containing substance is a hydrogen-containing polymeric material.

10. Apparatus in accordance with claim 6 wherein said hydrogen-containing substance is a liquid.

11. Apparatus for measuring epithermal neutron populations comprising:
    (a) a radiation detector sensitive to thermal neutrons,
    (b) neutron thermalizing material surrounding said radiation detector wherein neutrons having energies in the epithermal range are slowed down to thermal energies,
    (c) thermal neutron shielding means consisting essentially of cadmium enclosing said thermalizing material, said neutron absorbing material comprising cadmium being exposed to external neutron radiation, including epithermal neutrons to be detected, and
    (d) means for measuring indications produced in said radiation detector as a result of thermal neutrons to the substantial exclusion of indications produced by other atomic and nuclear particles and radiations simultaneously activating said detector.

12. Apparatus in accordance with claim 11 wherein said measuring means comprises an electrical circuit for selecting the desired indications on the basis of the relative amplitudes of pulses resulting from the detection of atomic and nuclear particles and radiations.

13. Apparatus for selectively measuring epithermal neutron populations in the presence of thermal neutrons and gamma rays comprising:
    (a) a scintillation detector sensitive to thermal neutrons and gamma rays, including a luminophor material and a photomultiplier tube,
    (b) means for slowing down epithermal neutrons to thermal energies comprising a neutron moderating material surrounding said scintillation detector,
    (c) means for selectively removing thermal neutrons comprising a thermal neutron capture material consisting essentially of cadmium surrounding said neutron moderating means, said neutron absorbing material comprising cadmium being exposed to external neutron radiation, including epithermal neutrons to be detected, and
    (d) means for selectively measuring electrical pulses produced by said scintillation detector and having an amplitude at least equal to the amplitude of pulses resulting from the detection of thermal neutrons in said scintillation detector.

14. Apparatus for logging earth formations traversed by a borehole comprising:
    (a) an instrument adapted to be passed through said borehole,
    (b) a source of neutrons in said instrument for irradiating said earth formations, and
    (c) means for detecting epithermal neutrons comprising in combination, a radiation detector selectively sensitive to neutrons below a predetermined energy level, outer shielding means substantially surrounding said detector and exposed to neutron radiation in the vicinity of said instrument including epithermal neutrons to be detected in a borehole for selectively preventing neutrons below a given energy level from passing toward said detector comprising cadmium, and moderating means positioned intermediate to said outer shielding means and said radiation detector for moderating neutrons having energies above said given energy level to a lower energy range below said predetermined energy level.

References Cited by the Examiner

UNITED STATES PATENTS

| | | | |
|---|---|---|---|
| 2,556,768 | 6/1951 | McKibben | 250—83.1 |
| 2,778,951 | 1/1957 | Tittman | 250—108 X |
| 2,862,106 | 11/1958 | Scherbatskoy | 250—71.5 |
| 2,920,204 | 1/1960 | Youmans | 250—83.1 |
| 3,080,478 | 3/1963 | Scherbatskoy | 250—83.1 X |
| 3,141,092 | 7/1964 | Weinberg | 250—83.1 X |

RALPH G. NILSON, *Primary Examiner.*

A. R. BORCHELT, *Examiner.*